United States Patent Office
3,684,472
Patented Aug. 15, 1972

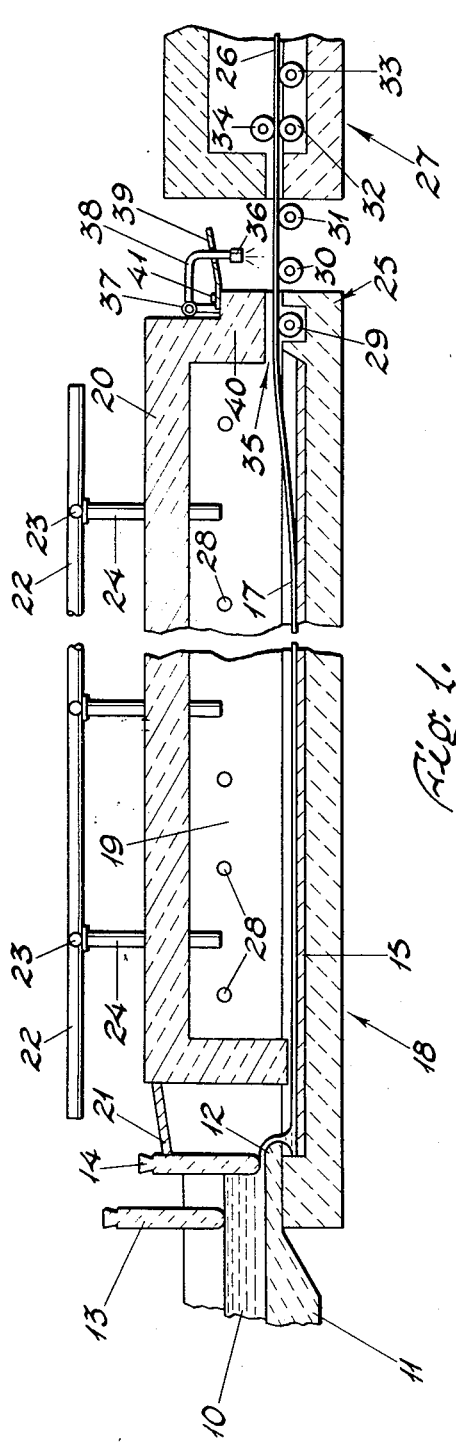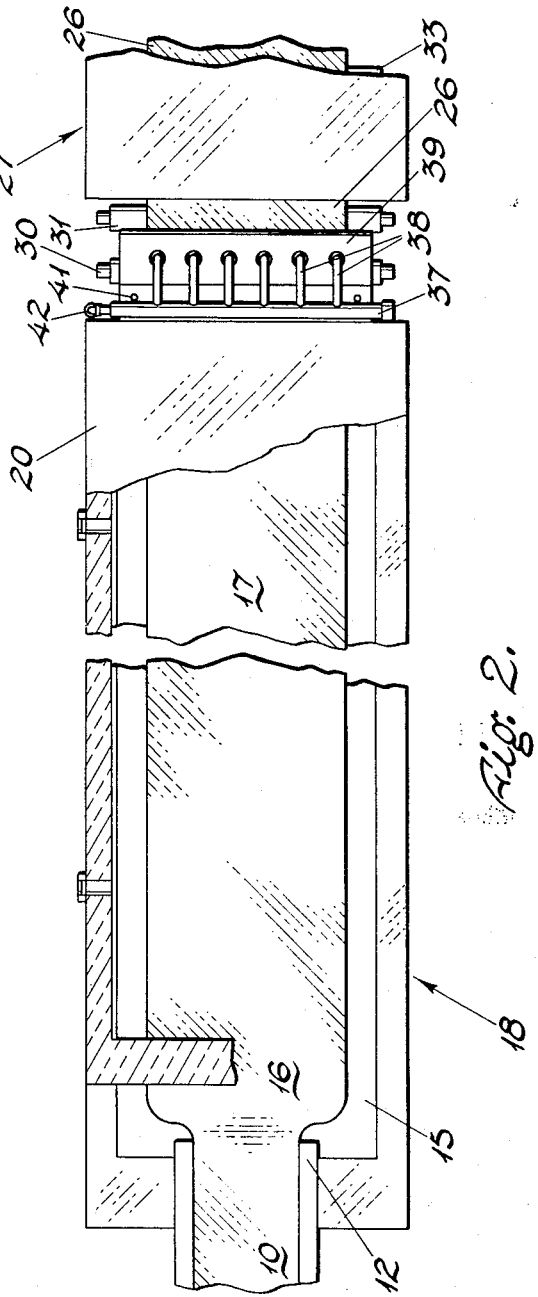

3,684,472
START UP HOOD IN FLOAT GLASS APPARATUS AND METHOD OF USING SAME
Francis L. Swillinger, Perrysburg, Ohio, assignor to Libbey-Owens-Ford Company, Toledo, Ohio
Filed Feb. 25, 1970, Ser. No. 14,003
Int. Cl. C03b 18/02
U.S. Cl. 65—99 A                                   8 Claims

ABSTRACT OF THE DISCLOSURE

Method and apparatus for treating the initial ribbon emerging from the exit end in the start up of a float glass bath to eliminate excessive cooling of the glass and facilitate passage of the continuous ribbon across the lift-out area and into an adjacent annealing lehr. A portable start up hood mounted above and extending across the width of the exit opening of the plenum chamber has a row of spaced burners extending through a baffle plate and firing down toward the emerging ribbon. The unit is easily disconnected and removed when not in use.

BACKGROUND OF THE INVENTION

Field of the invention

The present invention relates broadly to the manufacture of flat glass by the float process and, more particularly, to an improved method and apparatus which facilitates the transfer of the ulitmate ribbon from the exit end of the bath to the lehr during start up of the apparatus.

Description of the prior art

A conventional form of float glass apparatus is illustrated and described in U.S. Pat. No. 3,083,551, granted Apr. 2, 1963, and, as there explained, the manufacture of flat glass by the float process involves the delivery of glass at a controlled rate onto a bath of molten metal (such as tin or an alloy of tin, for example) and advancing it along the bath under physical and thermal conditions which assure (1) that a layer of molten glass will be established on the bath, (2) that the glass in the layer can flow laterally, unhindered to form on the surface of the bath a buoyant body of molten glass of equilibrium thickness, and (3) that the buoyant body will be continually advanced along the bath in ribbon form and progressively and sufficiently cooled to permit it to be taken out of the bath at the exit end thereof by mechanical means without harm to its surfaces.

The headspace volume above the bath is enclosed to form a plenum chamber which is filled with the protective, non-oxidizing float atmosphere. There is a short extension on the exit end of the bath which contains the initial lift-out rolls for transferring the glass ribbon onto the mechanical conveyor, and suitable atmosphere sealing means is provided above and below the ribbon to prevent ingress of outside oxygen.

While a plurality of heating elements located in the main plenum chamber provide heat to maintain the ribbon at the desired temperatures as it moves therethrough, the exit passageway and space between the bath and adjacent annealing lehr contain no auxiliary source of heat and must reach an equilibrium temperature by initially absorbing heat from the glass ribbon passing therethrough. Therefore, during the start up of the apparatus and before such equilibrium temperature is reached, the ribbon is cooled excessively when passing through the exit passageway and into the lehr.

In addition, the start up of the apparatus involves manually establishing a continuous body of glass extending from the spout at the entry end of the bath, through the exit end and into the lehr. This necessitates operating the process at a much lower rate than normal as the glass layer must be manually propelled and guided down the bath, lifted out in ribbon form at the exit end thereof onto the mechanical conveyor, and started through the lehr before the mechanical conveyor can be employed to apply the necessary tractive effort thereto.

Because much of the heat supplied to retain the bath temperature comes from the cooling layer of glass thereon, and the heating elements alone do not normally supply a sufficient amount to maintain the desired temperatures without such additional heat, the tendency at lower ribbon speeds is for the ribbon initially established on the bath to be cooled to a greater degree than desired.

Thus, in actual commercial start up experience with conventional prior art devices, the combination of the cooler bath and exit passageway causes the glass first being transferred out of the bath onto the lift out roll or rolls to be cooler and consequently stiffer than desired. This, in turn, causes the ribbon to exhibit a tendency to raise up into the air at the emergence angle and break off rather than to follow the contour dictated by the initial conveyor rolls. Establishment of the initial ribbon is thus a difficult and time consuming endeavor.

SUMMARY

According to the present invention the problems resulting from excessive cooling of the initial ribbon of glass are effectively overcome by the provision of a special portable auxiliary heating apparatus, which will hereinafter be referred to as a start up hood, located above the bath exit opening and including a plurality of gas burners which directly heat the ribbon in the lift out and transfer area. The unit is mounted above the exit passageway in such a manner that it may easily be disconnected and removed when not in use.

It is, therefore, a primary object of the invention to provide an effective heating apparatus for the lift out area at the exit end of a float glass bath.

Another object of the invention is to prevent the raising up and breaking of the initial ribbon at the exit end of the bath during start up of a float glass apparatus.

Still another object is the provision of an auxiliary heating unit for such float glass apparatus which, when not in use, may be easily removed and stored and will not interfere with further operation of the glass producing apparatus.

Further objects and advantages of the invention will become apparent in the course of the following description when taken in connection with the accompanying drawings.

BRIEF DESCRIPTION OF THE DRAWINGS

In the accompanying drawings, wherein like numerals are employed to designate like parts throughout:

FIG. 1 is a longitudinal, vertical sectional view through a conventional type of float glass forming apparatus but illustrating the exit end of the plenum chamber equipped with an auxiliary heater in accordance with the invention; and FIG. 2 is a plan view of the apparatus of FIG. 1 with part of the plenum chamber removed.

DESCRIPTION OF THE PREFERRED EMBODIMENTS

Referring now to the drawings, there is illustrated a representative float glass machine generally similar to that disclosed in U.S. Pat. No. 3,083,551. In this machine molten glass 10 is delivered from the forehearth of a glass melting furnace 11 over a spout 12 in an amount regulated and controlled by a tweel 13 and a gate 14. The glass flows from the spout onto a bath of molten metal 15 (which may be tin or an alloy of tin) to form a buoyant body of molten glass, indicated at 16, from which a buoyant body of stable thickness 17 develops in ribbon form.

The molten metal bath 15 is contained in a tank 18 and the headspace 19 above the bath is enclosed by a roof structure or plenum chamber 20 which together with roof extension 21, forms a closed volume large enough to contain a sufficient amount of the inert float atmosphere to protect the process. The protecting gas must be one which will not react with the molten metal to produce contaminants of either the molten metal or the glass (it may be a mixture of nitrogen and hydrogen, for example). The gas is initially supplied to the headspace 19, and thereafter continually replenished by means of a piping system which includes a main header 22, branches 23 and spaced plenum inlet ducts 24. A short exit extension 25 to the main plenum conventionally contains sealing means (not shown) both above and below the ribbon to prevent ingress of outside air.

Under normal operating conditions, the layer of glass 17 moves along the bath 15 and undergoes progressive controlled cooling from the tweel to the exit end so as to form an ultimate ribbon 26 having sufficient stiffness to be transferred from the bath to an adjacent lehr 27 by mechanical conveying means without detriment to its surfaces. A plurality of spaced heating elements 28 within the headspace provide the necessary heat input to maintain the desired temperatures within the layer of glass as it progresses along the bath.

The mechanical conveying means normally employed in transferring the ribbon from the bath to the lehr is represented by a series of spaced parallel support rolls 29 to 33 and a superimposed roll 34. Any or all of the rolls may be driven by conventional means and cooperate to apply a tractive effort to the continuous ribbon of glass such that it is moved along toward the exit end of the bath 15, lifted therefrom onto the initial or lift-out roll 29, and thereafter carried by the conveyor into the lehr 27.

When a ribbon of less than equilibrium thickness is desired, this can be obtained by increasing the speed of the rolls 29 to 34, thereby modifying their tractional effort and attenuating the molten equilibrium layer of glass 17.

As indicated above, during the initial start up of the apparatus the equilibrium layer 17 must be manually advanced along the bath 15 and the ultimate ribbon 26 first emerging from the exit end thereof must be established on the conveyor before the automatic mechanical drive system of the conveyor can be actuated to thereafter apply a tractive effort to the glass ribbon. Also, because the manual establishment and advancement of the ribbon is much slower than the normal mechanized operating speed, less molten glass is admitted to the bath per unit of time; and, therefore, correspondingly less total heat is released in cooling the molten glass to the state of the ultimate ribbon. The amount of heat relased from the heating elements 27 may only compensate for a portion of this difference and, consequently, the exit end of the bath 15 may cool below the desired exit temperature of the ultimate ribbon 26. This produces a cooler ribbon which may be to stiff to adjust to the directional change from the initial lift out of the bath back to the horizontal plane of the conveyor. The tendency is for the ribbon to continue to rise up and out of the bath at the lift-out angle and subsequently break outside the opening 35 in the exit extension 25.

In accordance with the present invention, this difficulty is overcome by supplying additional heat at the exit end of the plenum by means of an auxiliary, external heating system which directs heat onto the exiting ribbon.

To this end, a row of spaced heaters, which may be gas burners 36 are located above the exit opening 35 in the short space normally occurring between the exit end of the bath structure and the entrance to the annealing lehr. The burners 36 depend from a manifolding header 37 by means of fuel inlet pipes, 38 passing through a hood 39 which, in turn, may be supported from the roof 40 of the exit extension 25, as by fasteners 41 extending through openings in the head and into the roof. The hood is maintained at an angle which directs the heat toward the opening 35 and may be fabricated of any suitable heat-resisting sheet material such as stainless steel. Any conventional atmospheric nozzle type burner may be used, or the heat may be produced by other means such as electric resistance heating elements.

During the initial start up of the float glass machine, the burners are used to heat the bath exit area and to reheat the ultimate ribbon 26 as it first emerges from the exit extension 25, thereby modifying the stiffness of the ribbon and allowing it to be more easily established on the initial conveyor rolls 29 to 31.

When a continuous ribbon of glass has successfully been established from the buoyant layer 16 from the point of initial formation through its entry into the lehr 27, the mechanical conveyor is actuated and the speed, and consequently the corresponding material input, is gradually increased until the normal production rate is reached. At this point the quantity of heat supplied through the increased amount of highly heated molten glass entering the tank is such that the heating elements 28 can maintain the desired temperatures along the bath. Thus, the ultimate ribbon 26 emerges at a higher temperature allowing the exit extension area to reach the desired equilibrium temperature within a short time thereafter to thereby alleviate the problem of over-cooling of the ribbon. The burners of the invention can then be shut off as the additional heat is no longer necessary.

Another advantage of the invention is that subsequent to being used it may easily be removed to leave the space above the area between the tank 18 and the lehr 27 free from interference. This is accomplished by removing the fasteners 41 and disconnecting the manifold header at 42, which may be a coupling or other easily disconnected fitting located downstream of the shutoff valve therefor.

Thus, the present invention provides an easily portable auxiliary heating system which reheats the bath exit area and the initial ribbon of glass emerging therefrom, and thereby prevents breakage of the initial ribbon and significantly decreases the time consumed in establishing the ultimate ribbon on the conveyor.

I claim:

1. In a method of initially placing a float glass apparatus in operation including the steps of establishing a continuous layer of molten glass on a molten metal bath, advancing said layer in ribbon form along said bath to the exit end thereof, said ribbon becoming progressively cooler as it is advanced along said bath to said exit end, lifting the leading edge of the cooled and, therefore, stiffened ribbon from said bath at said exit end and establishing same on a horizontal conveying means in line therewith and which applies a tractive effort to said ribbon once same is established thereon, and continuing to advance said ribbon through an adjacent lehr, the improvement comprising the steps of applying heat to said ribbon as it initially emerges from said exit end of said bath between said bath and lehr to reduce the stiffness thereof and thereby facilitate said establishment on said conveying means, continuing to apply heat to said ribbon as the initial portion thereof moves through said lehr, and ceasing to apply said heat after a normal process equilibrium condition has been reached.

2. A method of initially placing a float glass apparatus in operation as claimed in claim 1, wherein said heat is applied by firing a plurality of gas burners spaced across and mounted above and adjacent said exit end of said bath in the direction of said ribbon.

3. A method of initially placing a float glass apparatus in operation as claimed in claim 2, wherein said burners form part of a portable unit, and including the step of removing said unit from said float glass apparatus after startup thereof has been completed.

4. A method of initially placing a float glass apparatus in operation as claimed in claim 1, including applying sufficient heat to adequately soften said emerging ribbon of glass and permit it to conform to said conveyor, thereby preventing initial breakage of said ribbon.

5. In apparatus for producing float glass including a tank containing a bath of molten metal over which a ribbon of glass is floated, a plenum chamber enclosing a volume of protective float atmosphere above said bath and having an entrance opening and exit passageway therebetween, a lehr aligned with and beyond said tank, and a continuous conveyor extending from the exit end of said bath through said lehr by which said continuous ribbon of glass is advanced, the improvement comprising an auxiliary startup hood mounted above and extending across the outer opening of said exit passageway between said tank and said lehr, and heating means within said hood for supplying heat to said ribbon in the exit area of said passageway.

6. Apparatus for producing float glass as claimed in claim 5, including heat deflecting and baffling means within said hood, wherein said heating means comprises nozzle-type gas burners depending from inlet pipes spaced along a common fuel supply header, said header being mounted above said heat deflecting and baffling means.

7. Apparatus for producing float glass as claimed in claim 6, wherein said heat deflecting and baffling means comprises a heat-resisting stainless steel plate.

8. Apparatus for producing float glass as claimed in claim 6, including means for mounting said start up hood comprising a plurality of removable fasteners attaching said heat deflecting and baffling means to the roof of the exit passage, and a detachable fitting connecting said header with a source of fuel whereby the entire unit can be readily removed when not in use.

References Cited

UNITED STATES PATENTS

| | | | |
|---|---|---|---|
| 3,486,869 | 12/1969 | Alonzo et al. | 65—99 X |
| 3,218,141 | 11/1965 | Lambert | 65—182 X |
| 1,554,269 | 9/1925 | Ferngren | 65—182 X |
| 3,507,637 | 4/1970 | Javaux | 65—182 X |

ROBERT L. LINDSAY, JR., Primary Examiner

U.S. Cl. X.R.

65—182 R, 186, 355